April 10, 1934.   L. A. HYLAND   1,953,961
MEANS FOR SUPPRESSING ELECTRICAL DISTURBANCES
Filed April 2, 1931
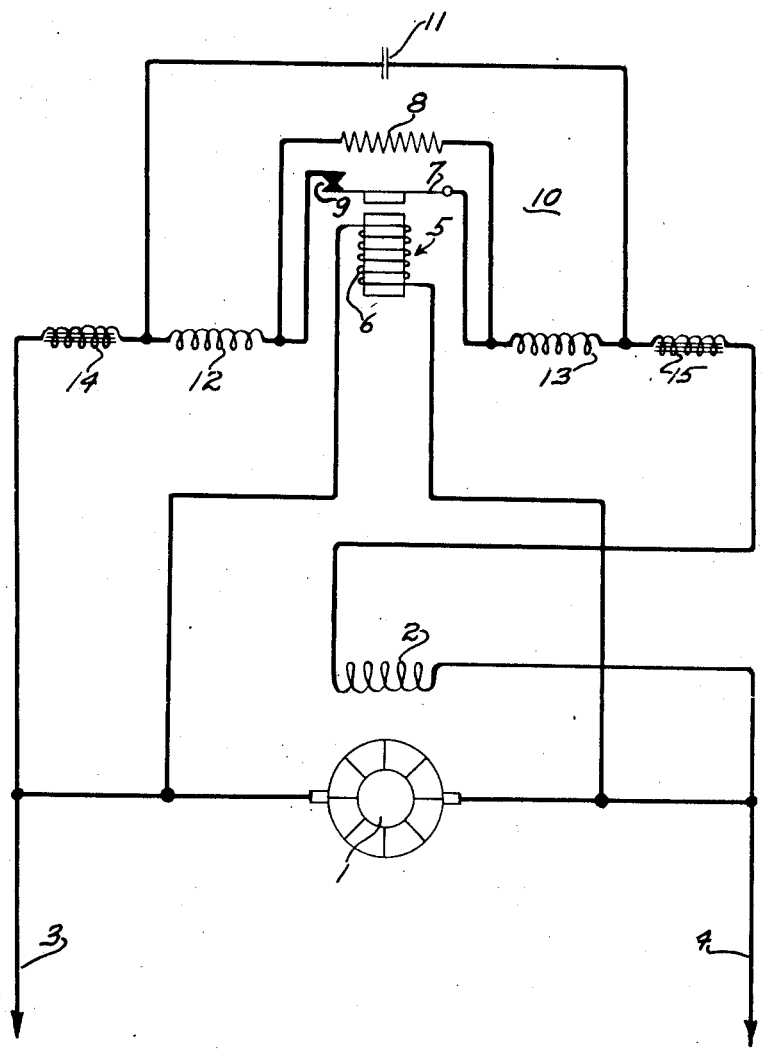
INVENTOR
Lawrence A. Hyland.
BY
ATTORNEY Patented Apr. 10, 1934

1,953,961

UNITED STATES PATENT OFFICE

1,953,961

MEANS FOR SUPPRESSING ELECTRICAL DISTURBANCES

Lawrence A. Hyland, Washington, D. C., assignor to Eclipse Aviation Corporation, East Orange, N. J., a corporation of New Jersey Application April 2, 1931, Serial No. 527,187

17 Claims. (Cl. 171—97)

(Granted under the act of March 3, 1883, as amended April 30, 1928; 370 O. G. 757)

The present invention relates to electrical apparatus and more particularly to means for suppressing electrical disturbances, as for example, parasitic electric disturbances or transients which may be present in an electrical circuit due to the operation of electrical contacting devices in said circuit or in the vicinity thereof.

In the operation of electrical contacting devices as for example, contact voltage regulators, as in the operation of any electrical circuit wherein current is interrupted by the making and breaking of electrical contacts, thus causing slight sparking, considerable disturbance is experienced in a radio receiving system which may be connected thereto or operated in the vicinity thereof. This is particularly true in aircraft where space is limited and electrical power devices are necessarily arranged in close proximity to each other.

One of the objects of the invention is to provide novel means whereby electrical disturbances or transients present in a supply circuit due to the operation of contacting devices are eliminated.

Another object is to provide in combination with a supply circuit having electrical contacting devices for controlling said circuit, novel means associated with said contacting devices whereby parasitic oscillations produced by said contacting devices are prevented from traversing said supply circuit.

Another object is to provide in combination with an electrical contacting device, novel means whereby electrical disturbances in circuits associated with or operating in the vicinity of said contacting device, by the operation of the latter, are substantially eliminated or prevented.

Still another object of the invention is to provide in combination with an electrical power supply circuit having electrical contacting devices for controlling said circuit, novel means embodying an oscillatory circuit associated with said contacting devices whereby parasitic oscillations produced by said contacting devices are suppressed and thereby prevented from causing disturbances in radio receiving systems connected to said supply circuit or employed in the vicinity thereof.

The above and other objects and advantages of the invention will be more fully apparent from a consideration of the detailed description which follows, taken together with the accompanying drawing wherein is illustrated one embodiment of the invention. It is to be expressly understood, however, that the drawing is for the purpose of illustration and description only and is not designed as a definition of the limits of the invention, reference being had for this purpose to the appended claims.

The single figure of the drawing is a wiring diagram of an electrical circuit arrangement embodying the present invention.

The novel means embodying the present invention are particularly adapted to be employed in combination with a direct current generator which is arranged to supply electrical energy to various types of auxiliary electrical apparatus, as for example storage batteries, lighting equipment, and radio receiving and transmitting systems, and having a voltage regulator of the contact type for maintaining the generator output voltage substantially constant.

In the drawing, the invention is shown employed with a direct current generator having an armature 1 and a shunt field winding 2, arranged to supply electrical energy to auxiliary apparatus (not shown) through the leads 3 and 4. A voltage regulator 5 is connected across the terminals of the generator and is provided with the usual shunt winding 6 and an armature 7, the latter being arranged to close the contacts 9 thereby shunting a resistance 8 which is normally in series with the field winding 2. The operation of the voltage regulator is well known in the art, and therefore, further discussion thereof is believed to be unnecessary.

During the operation of the voltage regulator, a certain amount of sparking occurs at the contacts thus producing transients or parasitic oscillations which have a disturbing effect upon electrical circuits in the vicinity of the generating equipment, particularly radio receiving systems which are highly sensitive to very slight disturbances. It is therefore desirable to suppress these parasitic oscillations, and to this end novel means are provided whereby said oscillations are suppressed at the source.

In the form shown, the means last referred to comprise an oscillatory circuit 10 connected across the contacts 9, and which includes the resistance 8, a suitable capacity 11 and inductances 12 and 13. It will be apparent that any oscillations set up in the circuit 10 by the operation of the contacts 9, will be at a frequency which is determined by the capacity and inductance of the circuit depending upon the values of the elements 11, 12, and 13, i.e., the natural frequency or the oscillations produced by the operation of the contacts will be that which is determined by the inductance and capacity of the oscillatory circuit.

Choke coils 14 and 15 are placed in series with the output of the oscillatory circuit 10 each of which has an impedance value such as to offer a very high impedance to the oscillatory currents at the designated frequency whereby such oscillatory currents will be choked or suppressed and prevented from reaching the output terminals 3 and 4 of the generator.

There is thus provided a novel circuit arrangement whereby parasitic oscillations, produced by the operation of electrical contacting devices, are suppressed at their source and their effects on adjacent electrical circuits substantially eliminated. The arrangement is extremely simple and much more efficient than devices of the prior art in that the parasitic oscillations are at a predetermined frequency and are then suppressed at these frequencies.

While only one embodiment of the invention has been illustrated and described, changes and modifications which will now appear to those skilled in the art, may be made without departing from the scope of the invention. For example, the elements 8, 11, 12, and 13 may be connected in parallel with each other, or in series-parallel, or in any other multiple circuit arrangement as may be desired or required. Reference is therefore to be had to the appended claims for a definition of the limits of said invention.

The herein described invention may be manufactured and used by or for the Government of the United States for governmental purposes without the payment to me of any royalties thereon.

What is claimed is:

1. The combination with a direct current generator, of a voltage regulator having relatively movable contacts, the operation of which produces disturbing electrical oscillations, an oscillatory circuit connected across said contacts for making the natural frequency of said disturbing oscillations equal to that which is determined by the inductance and capacity of the oscillatory circuit, and means connected in series with the oscillatory circuit and the field of the generator and having a relatively high impedance to said oscillations at the predetermined frequency for preventing said oscillations from passing to the output circuit of the generator, thereby eliminating electrical disturbances in circuits associated with or operating in the vicinity of said generator.

2. The combination with an electric generator, of a voltage regulator having relatively movable contacts, an oscillatory circuit associated with said contacts whereby the natural frequency of the oscillations set up by the making and breaking of said contacts is predetermined, and means for preventing said oscillations of predetermined frequency from passing to the output terminals of the generator.

3. The combination with an electric generator, of a voltage regulator therefor having relatively movable contacts, an oscillatory circuit including resistance, inductance, and capacity elements, said circuit being connected across said contacts whereby the natural frequency of the oscillations set up by the making and breaking of said contacts is predetermined, and means for preventing said oscillations of predetermined frequency from passing to the output terminals of the generator.

4. The combination with an electric generator, of a voltage regulator therefor having relatively movable contacts, an oscillatory circuit including resistance, inductance, and capacity elements, said circuit being connected in parallel with said contacts whereby the natural frequency of the oscillations set up by the making and breaking of said contacts is predetermined, and means in series with said oscillatory circuit for preventing said oscillations of predetermined frequency from passing to the output terminals of the generator.

5. The combination with an electric generator, of a voltage regulator therefor having relatively movable contacts, an oscillatory circuit including resistance, inductance, and capacity elements, said circuit being connected in parallel with said contacts whereby the natural frequency of the oscillations set up by the making and breaking of said contacts is predetermined, and means comprising a pair of choke coils in series with said oscillatory circuit and positioned one on each side thereof for preventing said oscillations of predetermined frequency from passing to the output terminals of the generator.

6. The combination with an electrical circuit having a movable-contact device for controlling said circuit, of means comprising an oscillatory circuit connected in parallel with the contacts of said contact device for making the natural frequency of the oscillations set up by the operation of the contact device equal to that which is determined by the inductance and capacity of the oscillatory circuit, and means connected in series with said oscillatory circuit and having a relatively high impedance to said oscillations at the predetermined frequency for suppressing said oscillations, thereby preventing electrical disturbances in circuits associated with or in the vicinity of the first mentioned electrical circuit.

7. The combination with an electrical circuit having a movable-contact device for controlling said circuit, of means comprising an oscillatory circuit connected in parallel with the contacts of said contact device for making the natural frequency of the oscillations set up by the operation of the contact device equal to that which is determined by the inductance and capacity of the oscillatory circuit, and means connected in series with said oscillatory circuit and having a relatively high impedance to said oscillations at the predetermined frequency for suppressing said oscillations, thereby preventing electrical disturbances in circuits associated with or in the vicinity of the first mentioned electrical circuit, said last mentioned means comprising a pair of choke coils positioned one on each side of said oscillatory circuit.

8. The combination with an electrical circuit having a movable-contact device for controlling said circuit, of means comprising an oscillatory circuit associated with said contact device for making the natural frequency of the oscillations set up by the operation of the contact device equal to the frequency which is determined by the inductance and capacity of said oscillatory circuit, and means having a relatively high impedance to said oscillations at the predetermined frequency for suppressing said oscillations, thereby preventing electrical disturbances in circuits associated with or operating in the vicinity of the first mentioned electrical circuit.

9. The combination with a direct current generator, of a voltage regulator therefor having relatively movable contacts, the operation of which produces disturbing electrical oscillations, an oscillatory circuit connected across said contacts for making the natural frequency of said disturbing oscillations equal to that which is determined by the inductance and capacity of the oscillatory circuit, said oscillatory circuit including resistance, inductance, and capacity elements in series relation, and means connected in series with the oscillatory circuit and the field of the generator and having a relatively high impedance to said oscillations at the predetermined frequency for preventing said oscillations from passing to the output circuit of the generator, thereby eliminating electrical disturbances in circuits associated with or operating in the vicinity of said generator.

10. The combination with a direct current generator, of a voltage regulator therefor having relatively movable contacts, the operation of which produces disturbing electrical oscillations, an oscillatory circuit including resistance, inductance, and capacity elements in series relation, said circuit being connected across the regulator contacts for making the natural frequency of said disturbing oscillations equal to that which is determined by the inductance and capacity of the oscillatory circuit, the resistance element of said oscillatory circuit being arranged to be cut in and out of said circuit by the closing and opening of the regulator contacts, and means comprising a pair of choke coils connected in series with the oscillatory circuit and the field of the generator and being connected one on each side of said oscillatory circuit, said choke coils having relatively high impedance to said disturbing oscillations at the predetermined frequency for preventing said oscillations from passing to the output circuit of the generator, thereby eliminating electrical disturbances in circuits associated with or operating in the vicinity of said generator.

11. In combination, an electrical circuit making and breaking device, a resistance element adapted to be short-circuited by said device, and an oscillatory circuit including said resistance element and a plurality of reactance elements connected in series therewith and with each other, said circuit being electrically connected to said device.

12. In combination, an electrical circuit making and breaking device, a resistance element adapted to be short-circuited by said device and an oscillatory circuit including said resistance element and a plurality of reactance elements connected in series therewith and with each other, said circuit being connected in parallel relation with said device.

13. In combination, a voltage regulator having relatively movable contacts, a resistance element adapted to be short-circuited by said contacts, and an oscillatory circuit including said resistance element and a plurality of reactance elements connected in series therewith and with each other, said circuit being connected in parallel relation with said relatively movable contacts.

14. In combination, an electrical circuit making and breaking device, a resistance element adapted to be short-circuited by said device, and an oscillatory circuit tuned to a predetermined frequency and including said resistance element and a plurality of reactance elements connected in series therewith and with each other, said circuit being electrically connected to said circuit making and breaking device.

15. In combination, a voltage regulator having relatively movable contacts, a resistance element adapted to be short-circuited by said contacts, and an oscillatory circuit tuned to a predetermined frequency and including said resistance element and a plurality of reactance elements connected in series therewith and with each other, said circuit being connected in parallel relation with said relatively movable contacts.

16. In combination, a source of current, a circuit making and breaking device having a pair of relatively movable contacts for interrupting said series, a resistance connected across said contacts and adapted to be short-circuited thereby, a reactance connected in series with said resistance, and a second reactance connected across said resistance and first reactance, said resistance and reactances constituting a series oscillatory circuit when the contacts are open.

17. In combination, a source of current, a circuit making and breaking device having a pair of relatively movable contacts for interrupting said source, a resistance connected across said contacts and adapted to be short-circuited thereby, a pair of reactances connected in series with said resistance, one at each end thereof, and a third reactance connected across said resistance and said first two reactances, said resistance and reactances constituting a series oscillatory circuit when the contacts are open.

LAWRENCE A. HYLAND.